March 18, 1924. 1,487,094
F. A. ENGASSER
ATTACHMENT FOR HEADERS
Filed Oct. 2, 1919
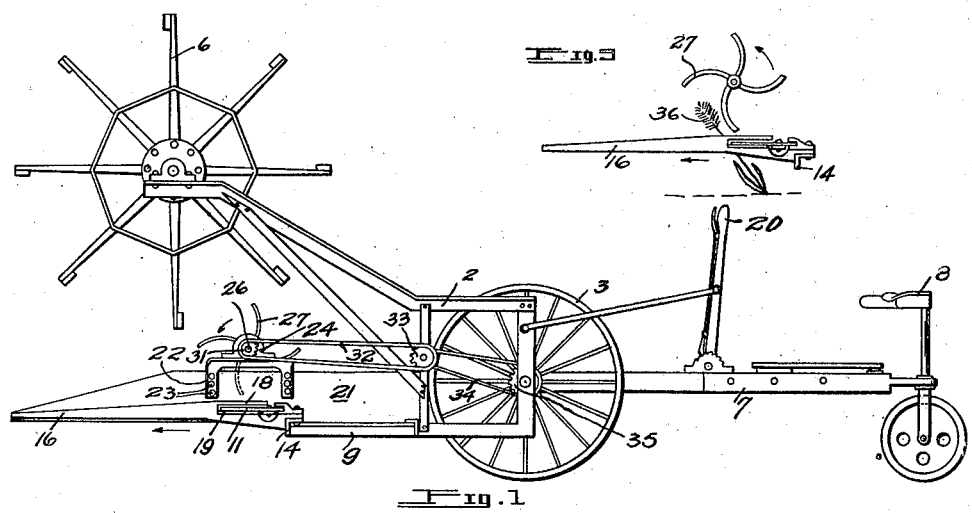
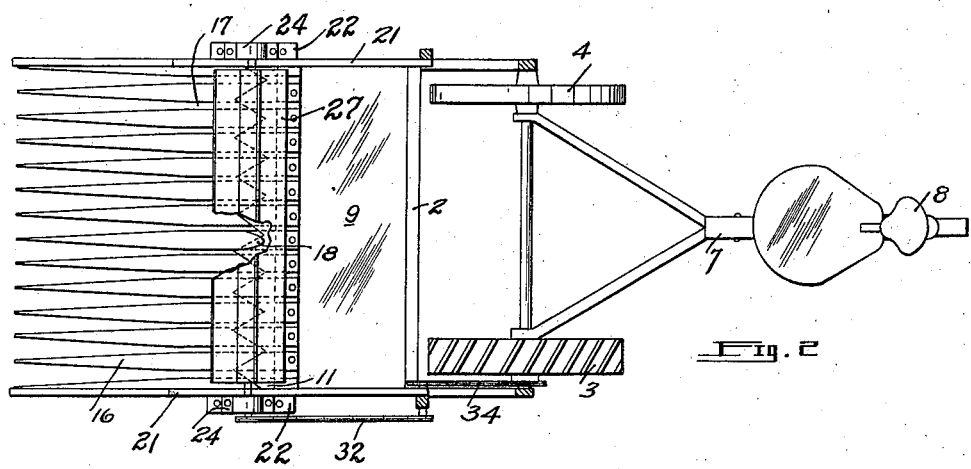
WITNESS:
Chas. S. Evans
INVENTOR.
Francis A. Engasser
BY White & Prost
his ATTORNEYS.

Patented Mar. 18, 1924.

1,487,094

UNITED STATES PATENT OFFICE.

FRANCIS A. ENGASSER, OF HELM, CALIFORNIA.

ATTACHMENT FOR HEADERS.

Application filed October 2, 1919. Serial No. 327,981.

*To all whom it may concern:*

Be it known that I, FRANCIS A. ENGASSER, a citizen of the United States, and a resident of Helm, county of Fresno, and State of California, have invented a new and useful Attachment for Headers, of which the following is a specification.

My invention relates to devices for harvesting and especially to headers.

An object of the invention is to provide means for adapting a header to handle milo maize, Egyptian corn and similar grains.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claim.

Referring to the drawings:

Figure 1 is an end elevation of a header embodying my invention, portions of the structure which are well known being omitted from the drawing.

Figure 2 is a plan view of the apparatus shown in Figure 1.

Figure 3 is a fragmentary view illustrating the operation of the device.

In harvesting milo maize or Egyptian corn and similar grains it is desirable that the head containing the grain be severed with only a small portion of the stalk attached. Ordinary machines for cutting grains are arranged to sever the stalks near the ground and are not adapted for cutting such grains as Egyptian corn in which the head grows on the top of the stalk which varies in height up to six or seven feet. In harvesting this crop, the grain bearing head only is desired and it has hitherto been necessary to cut the crop by hand. To cut an acre is considered an excellent day's work for one man.

My invention enables one man to cut from twenty to twenty-five acres in a day with a twelve foot cut machine, and the length of stalk left on the head is uniform irrespective of the height of the growing stalks.

In general terms my invention comprises means which may be conveniently attached to an ordinary header and which guides the stalks into proper position relative to the cutting means and then permits the stalks to be drawn through the guides as the machine advances across the field until at the proper moment, when the ends thereof are closely adjacent to the cutting means, they pass or are swept backwardly into the vibrating knife and severed.

In the drawings I have shown the main elements of a header as commonly constructed, the frame 2 mounted on the driving wheel 3 and grain wheel 4. The reel 6, push beam 7, steering apparatus 8, draper 9, and vibrating or reciprocating knife 11 are as ordinarily built and need not be described in detail.

Means are provided for guiding the stalks into a pre-cutting position, and this means serves the further purpose of picking up bent over stalks and separating tangled stalks, so that all the stalks not flattened against the ground are caught and move back to the pre-cutting position as the machine advances.

Secured to the lower frame member 14 of the machine, are arms 16 projecting forwardly from the machine so as to engage the lower portion of the stalks before the upper parts are touched by the reel 6. Usually the arms will be about three feet long but will of course vary in accordance with the structure of the machine on which my invention is used. These arms or guides are tapered toward the advancing ends as shown in Figure 2 preferably leaving about a third of each arm at the rear end with parallel sides. A plurality of the guides are spaced across the frame leaving a space 17, which may be about three-quarters of an inch, between them. The rear end of each guide arm is recessed around the knife 11, an upper portion 18 extending over the knife as a guard, and a suitable space is also provided in which the ledger plate 19 lies. The height of the guide arms from the ground is adjusted by movement of the tilting lever 20 in the usual way, so that they may be lowered to catch the short or bent over stalks.

Means are provided for preventing the stalks between the guides from being severed by the knife until, with the forward movement of the machine, the stalks are drawn through the guides so that only the heads and a very short amount of stalk project above the guides. At this moment, the stalks are swept rearwardly against the knife, or pass naturally to the knife because of the forward movement of the machine. After the cutting of the stalk, the heads fall upon the draper.

On each side of the frame 14 of the machine, a vertically disposed plate 21, similar to a grain board, is arranged. A U-bar or plate 22 is mounted on each plate for vertical adjustment by means of bolts through spaced holes 23, and mounted for longitudinal adjustment by similar means, upon the top of each plate 22 is a bearing 24 in which the shaft 26 of the feed reel 27 is journaled. The blades of the feed reel are curved as shown in Figure 1 and are preferably solid or webbed from outer edge to shaft. The feed reel is so adjusted vertically that the edges of the blades clear the guards 18 by a small amount, and longitudinally of the machine, so that the stalks are prevented from premature contact with the knife, that is to say, maintained in the pre-cutting position until the heads are drawn down close to the guard.

Rotary motion at a suitable speed in the direction of the arrow is imparted to the feed reel by means of any suitable driving gear mediately connecting it with the driving wheel 3. Conveniently such gear may consist of a sprocket 31 on the shaft 26 connected by chain 32 to the sprocket 33 mounted on the frame 2. The chain is made with removable links so that its length may be changed in accordance with the adjustment of the bearing boxes. On the same shaft with sprocket 33 is a second sprocket connected by chain 34 to sprocket 35 on the driving wheel hub.

As the machine is pushed forward into the growing stalks of corn or maize, the guides 16 pick up the bent and tangled stalks and direct them into the slots 17, the reel 6 assisting in keeping the stalks in an upright position. With the advance of the machine, the stalks are bent forward, being maintained in the pre-cutting position and prevented from touching the vibrating knife by the edges of the rotating feed reel, until the heads are closely adjacent to the guides, at which time, the stalks are freed from the feed reel and are caught by the advancing knife, or the heads are struck by the blades of the reel and swept backwardly, throwing the stalks against the knife. The severed heads then fall upon the draper and are conveyed away in the usual way.

Figure 3 shows a head 36 as it is drawn downwardly free of the reel, and about to be severed by the advancing knife.

I claim:

In an apparatus of the character described means for cutting stalks, means for directing said stalks toward said cutting means, a reel having a plurality of longitudinal blades of curved cross-section arranged above the cutting means for preventing engagement of the lower portions of the stalks with the cutting means and for sweeping the upper ends of the stalks into the cutting means, means for rotating the reel and means for vertically and horizontally adjusting said reel, comprising vertically adjustable U-bars, and bearings for said reel horizontally adjustable on said U-bars.

In testimony whereof, I have hereunto set my hand at Riverdale, California, this 19th day of September, 1919.

FRANCIS A. ENGASSER.

In presence of—
WM. BECKER,
RAY C. WILLIAMSON.